United States Patent [19]

Kato

[11] Patent Number: 5,694,909

[45] Date of Patent: Dec. 9, 1997

[54] ENGINE CONTROL SYSTEM AND SENSOR

[75] Inventor: Masahiko Kato, Hamamatsu, Japan

[73] Assignee: Sanshin Kogyo Kabushiki Kaisha, Japan

[21] Appl. No.: 725,207

[22] Filed: Sep. 23, 1996

[30] Foreign Application Priority Data

Sep. 22, 1995 [JP] Japan .................. 7-244686

[51] Int. Cl.⁶ .................................. F02D 41/00
[52] U.S. Cl. .................................. 123/672
[58] Field of Search .................. 123/672, 676, 123/679, 479, 417, 425, 435, 478

[56] References Cited

U.S. PATENT DOCUMENTS

| | | | |
|---|---|---|---|
| 4,433,654 | 2/1984 | Yokooku | 123/425 |
| 4,971,010 | 11/1990 | Iwata | 123/435 |
| 5,101,787 | 4/1992 | Kako | 123/417 |
| 5,209,206 | 5/1993 | Danno et al. | 123/479 |
| 5,215,068 | 6/1993 | Kato | 123/676 |
| 5,241,939 | 9/1993 | Nonaka | 123/492 |
| 5,251,602 | 10/1993 | Kurihara et al. | 123/527 |
| 5,299,549 | 4/1994 | Schatz | 123/672 |
| 5,329,907 | 7/1994 | Nonaka | 123/478 |
| 5,337,722 | 8/1994 | Kurihara et al. | 123/527 |
| 5,385,134 | 1/1995 | Krohm et al. | 123/676 |
| 5,622,158 | 4/1997 | Katoh et al. | 123/676 |

*Primary Examiner*—Raymond A. Nelli
*Attorney, Agent, or Firm*—Knobbe, Martens, Olson & Bear, LLP

[57] ABSTRACT

A combustion control system and method for operating an internal combustion engine to provide the desired air/fuel ratio under all running conditions. The system includes a feedback control which received output from an oxygen sensor coupled to one of the combustion chambers of the engine, the feedback control operating to modify the fuel/air ratio from that achieved by a basic setting that is derived from parameters of engine performance so as to maintain the desired ratio. The system also includes a mechanism for controlling backfire during operation of the feedback control. Backfire corresponding to the cylinder including the sensor is controlled by the system in a manner independent of the feedback control. Backfire corresponding to all other cylinders may be controlled independently of the feedback control or by changing overall feedback control parameters.

17 Claims, 10 Drawing Sheets

ENGINE CONTROL SYSTEM AND SENSOR

FIELD OF THE INVENTION

This invention relates to an engine control system and method, and more particularly to such a system and method which includes a feedback control which utilizes output from an oxygen sensor to adjust the air/fuel mixture of the engine and a mechanism for controlling backfire during feedback control.

BACKGROUND OF THE INVENTION

Various control methodology and systems have been employed in conjunction with internal combustion engines so as to improve their performance, particularly in the areas of fuel economy and exhaust emission control. One of the more effective types of controls is a so-called "feedback" control. With this type of control, a basic air/fuel ratio is set for the engine for given engine running parameters. The final adjustment in the air/fuel ratio is made from a sensor that senses the air/fuel ratio in the combustion chamber. Adjustments are then made from the basic setting in order to bring the air/fuel ratio into the desired range.

Normally, the type of sensor employed for such feedback controls is an oxygen ($O_2$) sensor. By determining the amount of oxygen in the exhaust gases from the combustion chamber, it is possible to fairly accurately measure the actual fuel ratio that was delivered to the combustion chamber.

The system operates on a feedback-control principle, continuously making corrections to accommodate deviations from the desired ratio. Adjustments are made in stepped intervals until the sensor output goes to the opposite sense from its previous signal. For example, if the mixture was running rich, then lean adjustments are made until the mixture strength is sensed to be lean. Adjustments are then made back into the rich direction in order to try to maintain the desired ratio.

These systems do not work satisfactorily during certain periods of engine operation. For example, when the engine is idling, the air/fuel mixture supplied to the engine is generally quite rich. At the same time, when the engine is idling there is poor air scavenge efficiency. As a result of the poor scavenge efficiency, insufficient oxygen is provided for combustion of the fuel supplied to the cylinder. Some fuel thus remains unburned after combustion in the cylinder. This unburned fuel is exhausted into the exhaust system. The result is often a backfire caused when the unburned fuel ignites in the exhaust system.

The backfire problem is compounded by the typical feedback control. When the feedback control adjusts the air/fuel mixture to the rich side of the desired ratio, the inability of the engine to combust this extra rich mixture results in an even greater amount of unburned fuel being exhausted.

It is, therefore, a principal object of this invention to provide an improved feedback control system for an engine.

It is a further object of this invention to provide an improved engine control system which includes a feedback control and a mechanism and method for controlling backfire.

SUMMARY OF THE INVENTION

This invention is adapted to be embodied in an internal combustion engine and control method. The engine comprises a number of cylinders having a combustion chamber and an air/fuel charging system for delivering an air/fuel charge to the combustion chamber for combustion therein. A combustion condition sensor is provided for sensing or detecting the air/fuel ratio in a single of the combustion chambers. A feedback control is employed for adjusting the air/fuel ratio delivered to the combustion chambers in response to the output of the combustion condition sensor.

In accordance with the engine control system and method of the present invention, backfire control or prevention means are provided in addition the feedback control. Backfire prevention corresponding to the monitored cylinder is accomplished via a mechanism which does not significantly affect the feedback control operation: the air volume to the cylinder is increased, the ignition timing is advanced, and/or the incremental changes in air/fuel ratio made by the feedback control are decreased. Backfire prevention corresponding to the other, non-monitored cylinders is achieved in a manner irrespective of whether changes to the feedback control are made, such as by causing the feedback control to increase the overall air/fuel ratio (i.e., making the air/fuel ratio leaner), or by increasing an air volume supplied to the cylinder(s), and/or advancing ignition timing.

DETAILED DESCRIPTION OF THE PREFERRED EMBODIMENTS OF THE INVENTION

Figure 1:
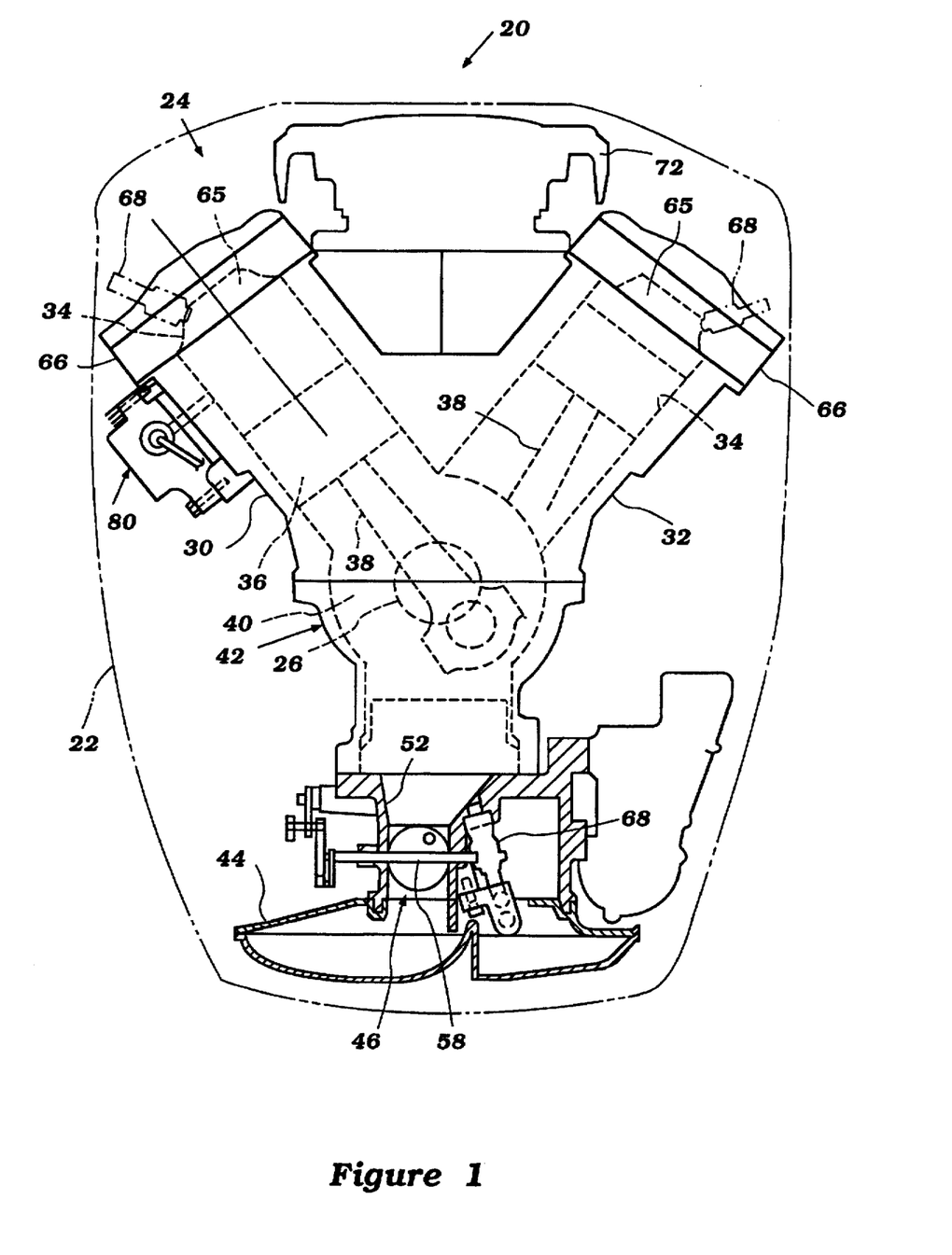
FIG. 1 is a top elevational view, with portions broken away, illustrating an outboard motor engine mounted within a housing, the engine including an oxygen sensor mounted in communication with one of the cylinders of said engine.

Referring now in detail to FIG. 1, an outboard motor 20 constructed and operated in accordance with this embodiment is illustrated. The invention is shown in conjunction with an outboard motor because the invention has particular utility in conjunction with, although not limited to, two-cycle crankcase compression engines. Such engines are normally used as the propulsion device for outboard motors. For these reasons, the full details of the outboard motor 20 will not be described and have not been illustrated. Those skilled in the art can readily understand how the invention can be utilized with any known type of outboard motor.

The outboard motor 20 includes a power head 22 that is comprised of a powering internal combustion engine, indicated generally by the reference numeral 24. The construction of the engine 24 will be described later, but it should be noted that the engine 24 is mounted in the power head 22 so that its crankshaft, indicated by the reference numeral 26, rotates about a vertically extending axis. The engine crankshaft 26 is coupled to a drive shaft that extends to drive the propeller (not shown) of the motor 20.

Figure 2:
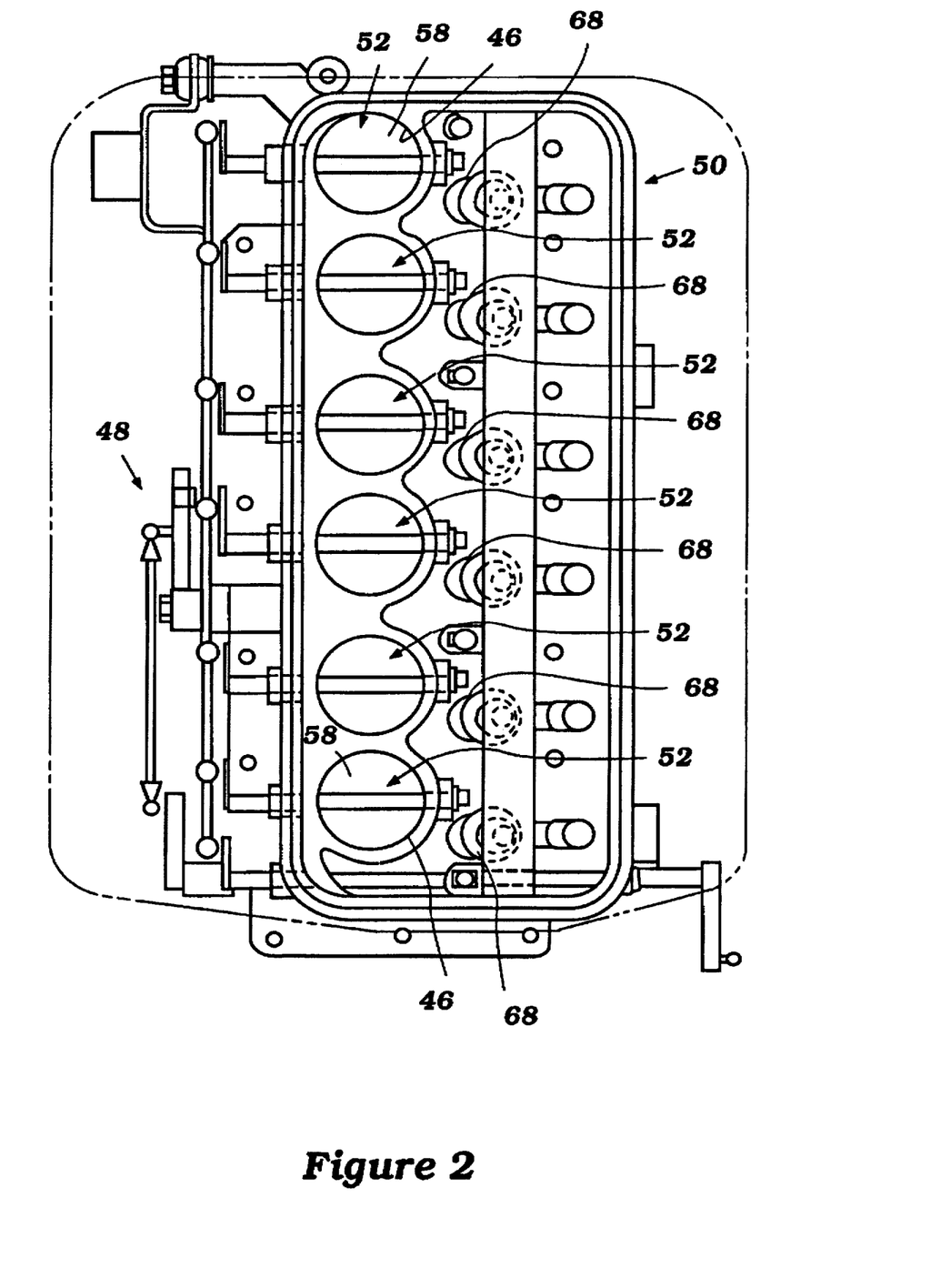
FIG. 2 is a cross-sectional view of the engine illustrated in FIG. 1 and taken perpendicular thereto, illustrating a throttle and intake mechanism for the engine.
Figure 6:
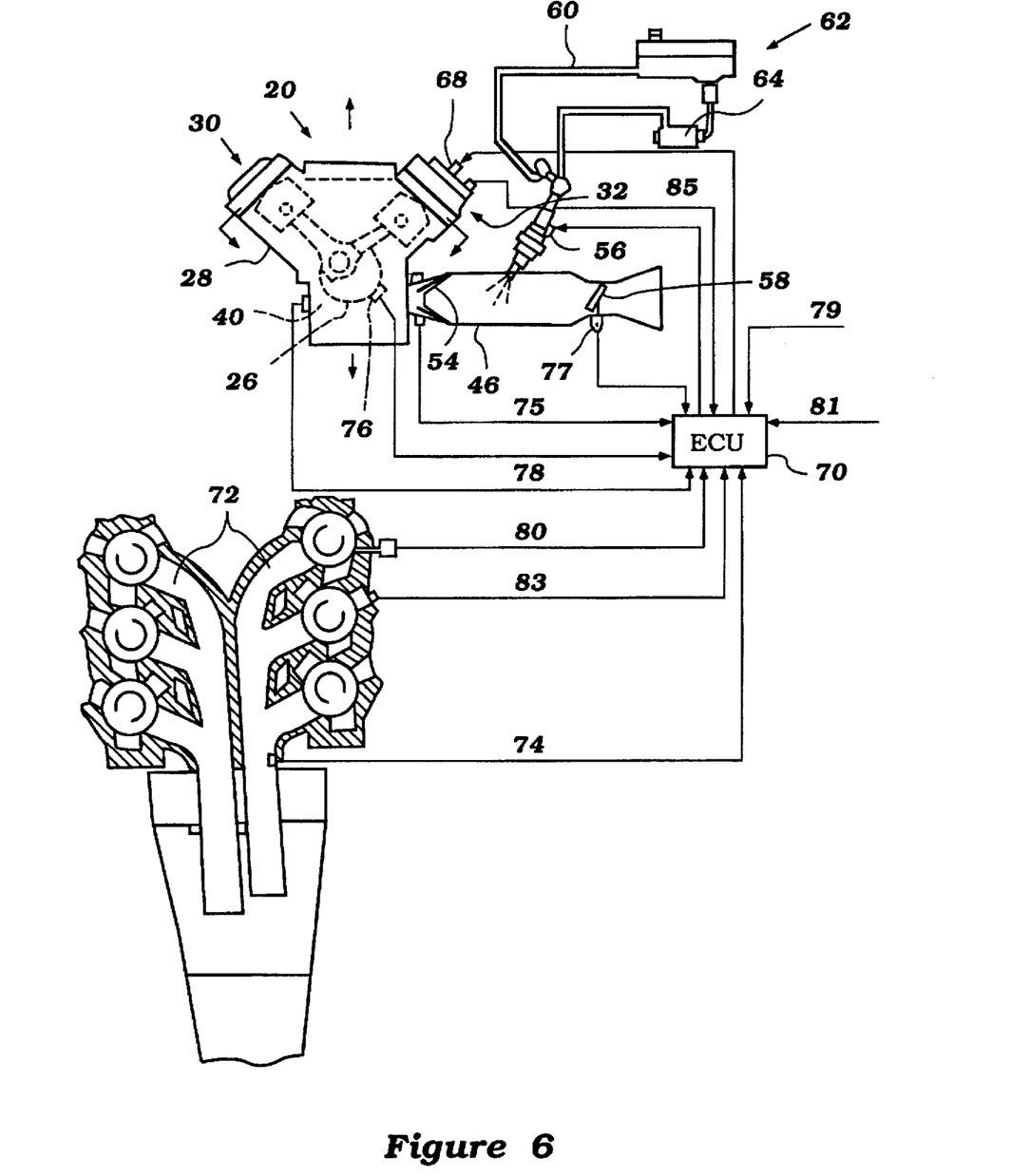
FIG. 6 diagrammatically illustrates the interconnection of various engine sensors with an engine control unit which may be used with the present invention.

Referring now primarily to FIGS. 1, 2, and 6, the engine 24 is depicted as being of the two-cycle, crankcase compression type and, in this embodiment, is of the V 6 type. Although this particular cylinder configuration is illustrated, it will be apparent to those skilled in the art how the invention may be employed with engines having other numbers of cylinders and other cylinder orientations. As will be apparent to those skilled in the art certain facets of the invention may also be employed with rotary or other ported type engines.

The engine 22 includes a cylinder block 28 having a pair of cylinder banks 30 and 32 in each of which three cylinder bores 34 are formed. A piston 36 reciprocates in each cylinder bore 34. Each piston 36 is connected by means of a connecting rod 38 to the crankshaft 26. The crankshaft 26 is, in turn, journaled for rotation within a crankcase chamber 40 in a suitable manner. The crankcase chamber 40 is formed by the cylinder block 28 and a crankcase member 42 that is affixed to it in any known manner.

As is typical with two-cycle crankcase compression engine practice, the crankcase chamber 40 is divided into compartments, the compartments associated with each of the cylinder bores 34 sealed relative to each other in an appropriate manner. A fuel-air charge is delivered to each of the crankcase chambers 40 by an induction system which is comprised of an atmospheric air inlet device 44 which draws atmospheric air through an inlet from within the protective cowling. This air is admitted to the protective cowling in any suitable manner.

FIG. 2 best illustrates an intake manifold 50 and throttle control assembly 48 which includes a throttle control linkage for controlling a throttle valve 58 positioned in respective branches 46 of the manifold. The intake manifold 50 is positioned downstream of the air inlet 44 and is operated in any known manner. The intake system discharges into intake ports 52 formed in the crankcase member 42. Reed-type check valves 54 (see FIG. 6) are provided in each intake port 52 for permitting the charge to be admitted to the crankcase chambers 40 when the pistons 36 are moving upwardly in the cylinder bore 34. These reed-type check valves 54 close when the piston 36 moves downwardly to compress the charge in the crankcase chambers 42, as is also well known in this art.

Fuel is added to the air charge inducted into the crankcase chambers 40 by a suitable charge former. As best illustrated in FIGS. 2 and 6, this charge former comprises fuel injectors 56, each mounted in the respective branches 46 of the intake manifold 50 downstream of the respective throttle valves 58. The fuel injectors 56 are preferably of the electronically operated type. That is, they are provided with an electric solenoid that operates an injector valve so as to open and close and deliver high-pressure fuel directed toward the intake port 52.

Fuel is supplied to the fuel injectors 56 under high pressure through a fuel supply system, indicated generally by the reference numeral 60 in FIG. 6. This fuel supply system 60 includes a fuel tank 62 which is positioned remotely from the outboard motor 20 and preferably within the hull of the watercraft propelled by the outboard motor. Fuel is pumped from the fuel tank 62 by means of a low pressure fuel pump 64, which may be electrically or otherwise operated.

This fuel then passes through a fuel filter, which preferably is mounted within the power head of the outboard motor 20. Fuel flows from the fuel filter through a conduit into a fuel vapor separator, which includes a float controlled valve for controlling the level of fuel in the fuel vapor separator. Any accumulated vapor will condense, and excess vapor pressure can be relieved through a suitable vent (not shown).

The fuel-air charge which is formed by the charge-forming and induction system as thus far described is transferred from the crankcase chambers 40 to combustion chambers 65. These combustion chambers 65 are formed by the heads of the pistons 36, the cylinder bores 34, and a respective cylinder head assembly 66 that is affixed to each bank 30 and 32 of the cylinder block 28 in any known manner. The charge so formed is transferred to the combustion chamber 65 from the crankcase chambers 40 through one or more scavenge passages.

Spark plugs 68 are mounted in the cylinder head 66 and have their spark gaps extending into the combustion chambers 65. The spark plugs 68 are fired by a capacitor discharge ignition system as is well known in the art. This outputs a signal to a spark coil which may be mounted on each spark plug for firing the spark plug 68 in a known manner. The capacitor discharge ignition circuit is operated, along with certain other engine controls such as the regulated fuel pressure, by an engine management ECU, shown schematically and identified generally by the reference numeral 70 in FIG. 6.

When the spark plugs 68 fire, the charge in the combustion chambers will ignite and expand so as to drive the pistons 36 downwardly. The combustion products are then discharged through exhaust ports formed in the cylinder block 28. These exhaust gases then flow from each cylinder bank 30,32 through a respective exhaust manifold 72 downwardly to an appropriate exhaust system as is also well known in the art.

Though not described in detail herein, the engine 24 preferably includes a cooling and/or lubricating system, of types known in the art.

It has been noted that the ECU 70 controls the capacitor discharge ignition circuit and the firing of the spark plugs 68. In addition, the ECU 70 controls the fuel injectors 56 so as to control both the beginning and duration of fuel injection and the regulated fuel pressure, as already noted. The ECU 70 operates on a strategy for the spark control and fuel injection control 56 as will be described.

So as to permit engine management, the ECU 70 employs a number of sensors. Some of these sensors are illustrated in FIG. 6 either schematically or in actual form, and others are not illustrated. It should be apparent to those skilled in the art, however, how the invention can be practiced with a wide variety of control strategies other than or in combination with those which form the invention.

An exhaust sensor assembly is positioned in an exhaust passage within the exhaust manifold 72. A crankshaft position sensor 76 which senses the angular position of the crankshaft 26 and also the speed of its rotation. A crankcase pressure sensor 78 may also provided for sensing the pressure in the individual crankcase chambers 80. Among other things, this crankcase pressure signal may be employed as a means for measuring intake air flow and, accordingly, controlling the amount of fuel injected by the injector 68, as well as its timing.

A temperature sensor 75 may be provided in the intake passage downstream of the throttle valve 58 for sensing the temperature of the intake air. In addition, the position of the throttle valve 58 is sensed by a throttle position sensor 77. An atmospheric pressure sensor 79, cooling water temperature 81, engine temperature sensor 83, and inner cylinder pressure sensor 85 are also provided. There may also be a knock detector, battery voltage detector, starter switch detector and engine kill switch detector, among others.

The types of sensors which may be utilized for the feedback control system provided by the ECU 70 are only typical of those which may be utilized in conjunction with the invention. Additional sensors known in the art may be utilized.

The invention deals primarily with the feed back control utilizing an oxygen sensor 80. For that reason, further details of the description of the components of the engine and outboard motor that have no particular importance in conjunction with the understanding of the construction and operation of the feed back and related control and thus have been omitted.

Figure 3:
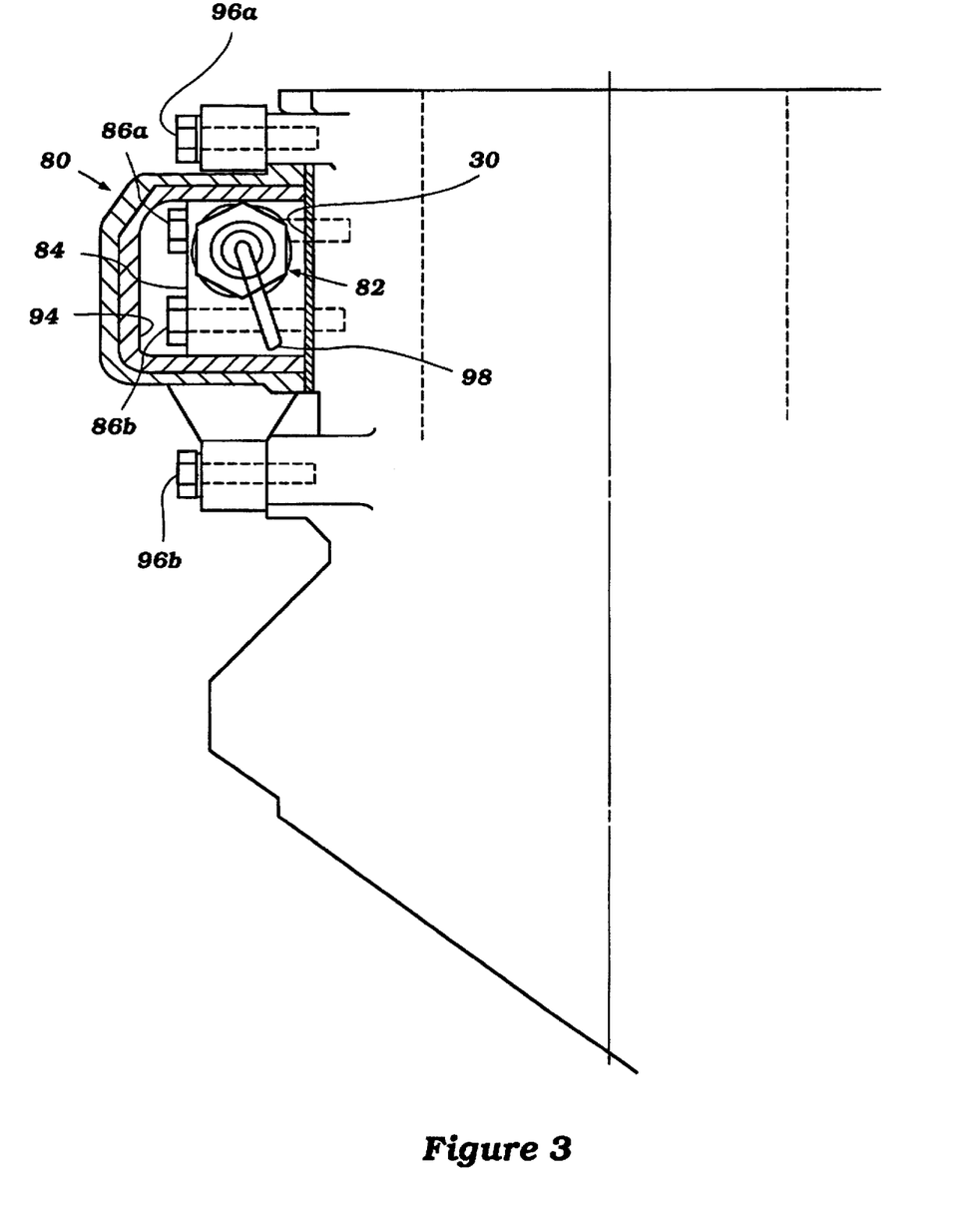
FIG. 3 is a partial enlarged view of the engine illustrated in FIG. 1 illustrating an end of the oxygen sensor.
Figure 4:
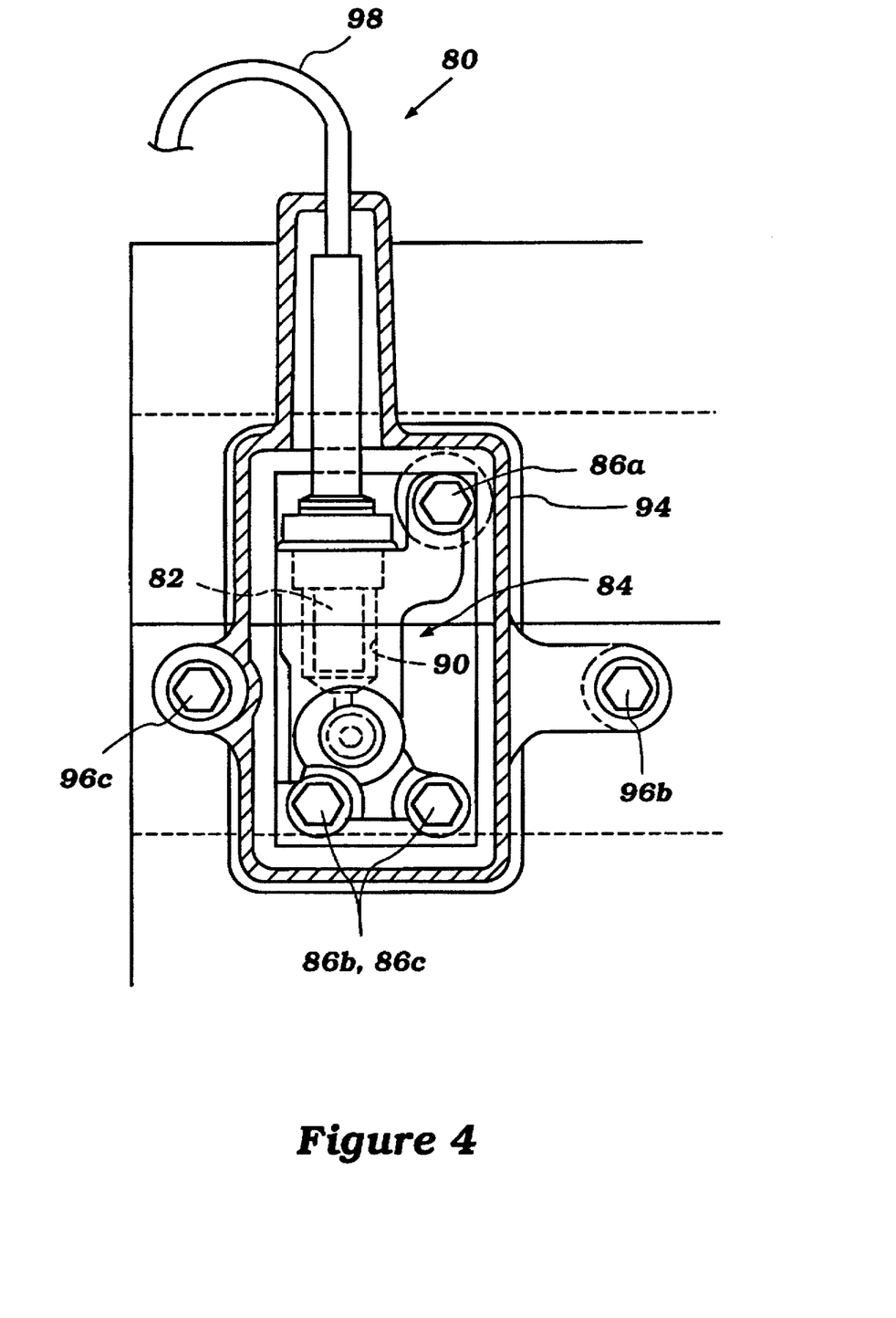
FIG. 4 is side view illustrating the sensor of FIG. 3.
Figure 5:
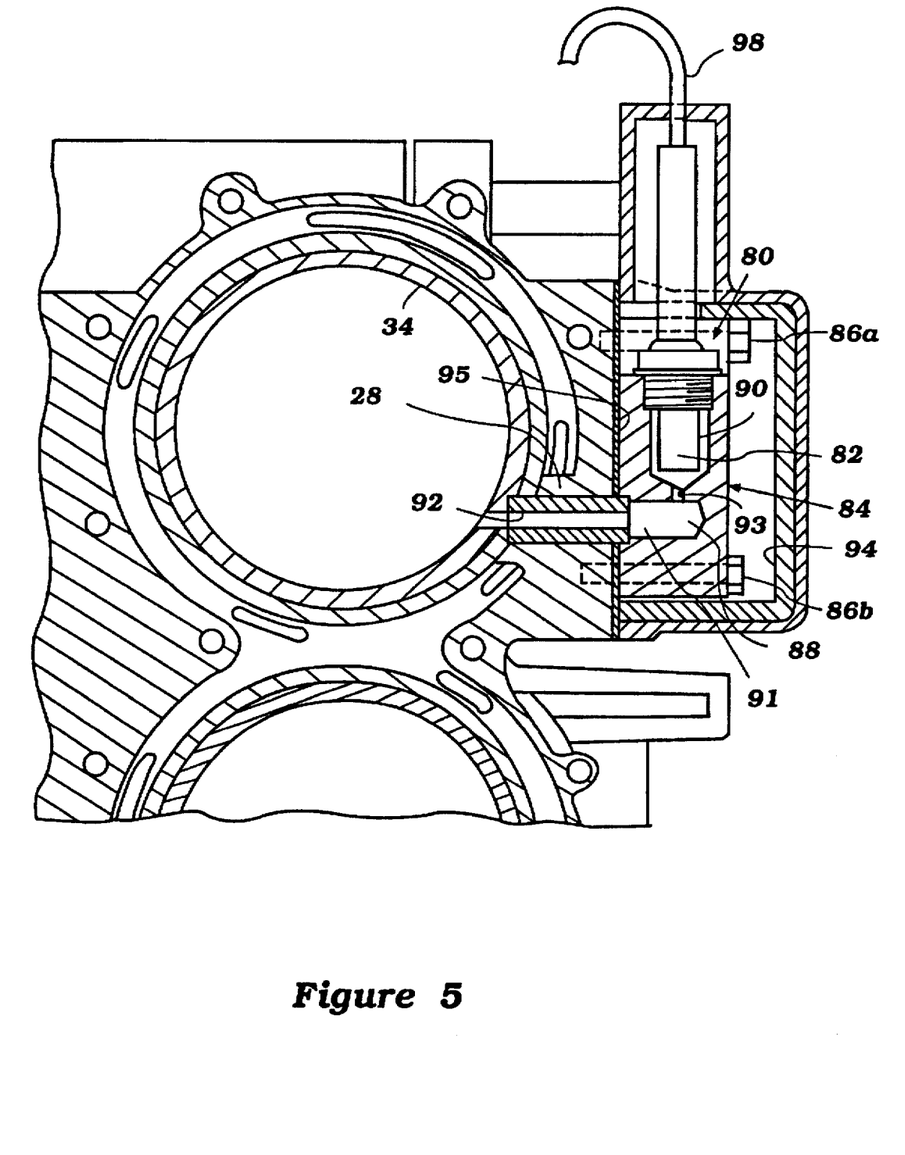
FIG. 5 is a top view, in partial cross-section, of the sensor of FIG. 3.

The sensor assembly 80 has a construction as best shown in FIGS. 3–5.

The sensor 80, in this case an oxygen ($O_2$) sensor, has its sensing portion 82 mounted within a fitting 84. The fitting 84 has a threaded connection for engagement with the sensor 80. The fitting 84 is connected to the engine block 28 with bolts 86a, 86b, 86c. As best illustrated in FIG. 5, the fitting 84 has a passage 88 therethrough extending in communication with the chamber 90. The passage 88 includes a first enlarged region 91 in alignment with a passage 92 extending through the block 28 in communication with the exhaust passage for the cylinder, and a second narrower portion 93 leading to the chamber 90 and extending generally perpendicular to the enlarged region 91.

A protective guard 94 extends around the fitting 84 and sensor 80, protecting them from damage. The guard 94 is connected to the block 28 with bolts 96a, 96b or similar means of attachment. An isolation gasket 95 separates the fitting 84 from the engine block 28.

The sensor portion 82 is formed as well-known in the art. As an example, the sensor portion 82 may include a platinum-plated glass tube having a hollow center. In this type of sensor 80, an electrical heater extends in to a hollow center along the centerline of the sensor and communicates with the ECU through a shielded conductor 98. As is known, the element 80 provides an output signal indicative of the oxygen content in the exhaust gas, and thus provides an indicator whether the fuel/air mixture is stoichiometric or not. The actual constituency of the sensor 80 may be of any desired type utilized in this control art.

In the embodiment illustrated, the oxygen or combustion condition sensor 80 has been positioned in direct registry with the combustion chamber or exhaust port of one of the cylinders, namely cylinder number 1. This system thus senses the combustion condition, i.e., air/fuel ratio, in only one combustion chamber and controls all remaining combustion chambers as well as that chamber from the output of this single sensor 80.

Preferably, the oxygen sensor 80 is positioned so as to communicate directly with the combustion chamber either through the wall of the cylinder bore or into the exhaust manifold portion serving that cylinder. However, to facilitate positioning and still obtain this result, it may be possible to mount the sensor 80 in a common portion of the exhaust system.

Referring to FIG. 6, the ECU 70 and its input and output signals are illustrated, including the output signals to the fuel injectors 56 and the spark plugs 68 for controlling the time of beginning of injection of each of the fuel injectors 56, the duration of injection thereof and also the timing of firing of the spark plugs 68. In addition, each cylinder is provided with a respective detector which is associated with the crankshaft and indicates when the respective cylinder is in a specific crank angle. This may be such a position as bottom dead center (BDC) or top dead center (TDC). These sensors cooperate along with the basic crank angle position sensor 76 and provide indications when the respective cylinders are in certain positions as noted.

In addition to those inputs noted, various other ambient engine or related inputs may be supplied to the ECU for the engine management system.

ECU may include a memory containing maps for control during certain phases of non-feedback control. For example, the ECU 70 may also control, in addition to the fuel injectors 56 and the firing of the spark plugs 68, the fuel pump the lubricating pump and the like for the engine 24. Obviously, those skilled in the art will understand how these various controls cooperate with the components of the engine to provide their control, as will become apparent.

The outputs from the engine speed determination and throttle opening or load are sent to a number of calculating sections in the ECU 70. These include a section that computes the ignition timing for each cylinder. This information is derived from an appropriate map such as may be reserved in the aforenoted memory and is based upon the time before or after top dead center for each cylinder. By taking this timing and comparing it with the actual crankshaft rotation, the appropriate timing for all cylinders can be calculated.

In addition, the basic maps aforereferred to also contain an amount of fuel required for each cylinder for the sensed engine running conditions. This is in essence a basic fuel injection amount computation. This computation may be based either on fuel volume or duration of injection timing. Air flow volume and other factors may be employed to set the basic fuel injection amount.

The ECU 70 sets basic fuel injection amount and timing determined by engine speed and load, and once the system is operating and the oxygen sensor 80 is at its operating temperature, the system shifts to a feedback control system. This feedback control system is superimposed upon the basic fuel injection amount and timing and spark timing so as to more quickly bring the engine to the desired running condition.

As has been noted, the output or combustion condition in one combustion chamber only is sensed and that signal is employed for controlling the other cylinders. There are some times when cylinders are disabled to reduce the speed of the engine for protection. The ECU 70 ensures proper control also during these times even if the disabled cylinder is the one with which the sensor is associated.

The ECU 70 may be programmed to include various operational modes, each of which is activated dependent primarily upon the results of the inputs from the various sensors.

The available modes may include a start-up mode when the engine is first started, an oxygen sensor feedback mode under which feedback control will be accomplished, and a study or memory mode where data from engine running conditions is stored.

Another potential mode is the operation when a cylinder or more is being disabled to affect speed control and protection for a so-called "limp home" mode. The ECU 70 may also include two time programs or control loops: loop 1, which repeats more frequently than the other loop (loop 2). These alternative control loops are utilized so as to minimize the memory requirements and loading on the ECU 70. For example, loop 1 may comprise the reading of the output of certain switches such as a main engine stop or kill switch, a main switch for the entire circuit, or a starter switch. The purpose for reading these switches is to determine whether the engine is in the starting mode or in a stopping or stopped mode so as to provide information for determining the proper control mode for the ECU 70 to execute.

If loop 1 is not being performed or if it has been completed, the ECU 70 moves to determine if the time has run so as to initiate the loop 2 control routine. If the system is operating in the loop 2 mode of determination, the ECU 70 then moves to read the output from certain additional switches, such as the lubricant level switch, the neutral detector switch and the DES output switch to determine if any of these specific control routines conditions are required. The ECU 70 determines if the system should be operating under normal control or misfire control. If no misfire control is required because none of the engine protection conditions are required, then the ECU 70 determines from the basic map the computation of the ignition timing, injection timing and amount of injection per cylinder. As has been previously noted, this may be determined from engine speed and engine load with engine load being determined by throttle valve position.

If it is determined that the misfire or speed control is required by eliminating the firing of one cylinder, the ECU 70 determines from a further memory map the ignition timing and injection timing and duration.

Once the basic ignition timing and injection timing and amount are determined, the ECU 70 computes certain compensation factors for ignition and/or injection timing. These compensation factors may include such outputs as the altitude pressure compensation and engine temperature compensation determined by the outputs from the respective sensors. In addition, there may be compensation for invalid injection time and ignition delay.

The ECU 70 may include a control routine to determine if the engine 24 is moving in a forward or a reverse direction. If it is determined that the engine is rotating in a reverse direction, the ECU 70 initiates engine stopping. This may be done by ceasing the ignition and/or discontinuing the supply of fuel.

If the engine continues to be operated, the ECU 70 determines if the immediately detected cylinder is cylinder number 1. As has been noted, cylinder number 1 is the cylinder with which the oxygen sensor 80 is associated.

Once cylinder number 1 is the cylinder that is being immediately sensed, the ECU 70 determines if the engine is operating in a cylinder disabling move. If it is not, the ECU 70 clears the register of the disabling information because the engine is now operating under a normal condition. If, however, it is determined that the system is operating in the disabled cylinder mode so as to reduce or control maximum engine speed, the ECU 70 determines if the pattern by which the cylinder is disabled should be changed. As has been previously referred to, if the engine is being operated with one or more cylinders disabled so as to limit engine speed for the limp home mode, it is desirable to only disable a given cylinder for a predetermined number of cycles. If the disabling is extended, then on returning to normal operation the spark plug in the disabled cylinder may be fowled and normal operation will not be possible or will be very rough. If it is not time to change the disabled cylinder or if the disabled cylinder number is changed, the ECU 70 then sets up or updates the information as to the cylinder which is being disabled and the ignition disabling for that cylinder. The ECU 70 then actually steps up the ignition pulse for the disabled cylinder and ensure that the cylinder will not fire and ensures that the disabled cylinder will not receive fuel from the fuel injection.

The ECU 70 may also include a control routine that is employed so as to stop the engine if the engine is running too slow. When the ECU 70 determines that the engine is running too slow and fouling will occur to cause stalling, the engine is shut down before that occurs.

The ECU 70 further includes a feedback control range which exists when the engine temperature and specifically the oxygen sensor 80 temperature is sufficient so as to provide reliable information by which feedback control may be enjoyed. Operation of the ECU 70 in feedback control mode may also be dependent on other requisite engine parameters, such as engine rpm. If the ECU 70 determines the engine is operating in a condition allowing oxygen feedback control, it makes the necessary feedback control compensations based upon the output of the oxygen sensor 80, as described below.

When the engine is originally started and before the engine, or more specifically the oxygen sensor 80 is at its operating temperature, there is an open ECU 70 engine control based upon a preset map or control strategy.

Figure 8A:
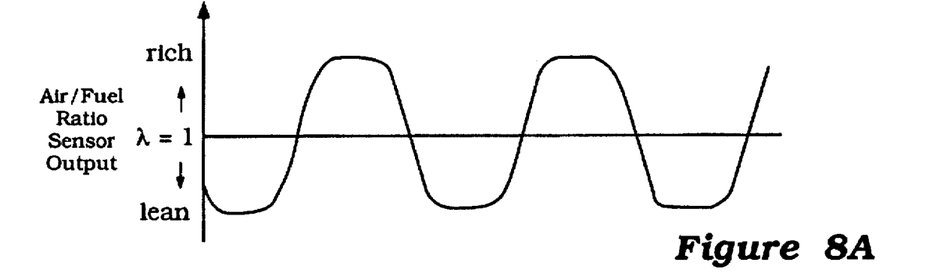
FIG. 8a is a diagram illustrating the air/fuel ratio sensor output as compared to air/fuel ratio, versus time.

When the oxygen sensor 80 begins to reach its operating temperature it provides an output a signal, normally in the form of an output voltage. As illustrated in FIG. 8a, the engine 24 is basically run on the lean side of the desired air/fuel ratio for that engine speed during initial startup. When there is a switch-over to the feedback control the ECU 70 employs a normal control strategy in which the fuel amount will be increased. This fuel increase will then be continued to occur in steps until the change in voltage of the oxygen sensor output causes the ECU 70 to begin the process of bringing air/fuel ratio back from rich to lean.

FIG. 8a illustrates the fuel injection volume for the feedback control strategy of the ECU 70. Beginning near the left of the time line in FIG. 8a, the engine is normally operating at a lean air/fuel mixture when the feedback control condition first becomes operable. At that time "rich" air/fuel adjustments are normally made in accordance with a normal feedback control until the mixture is sensed by the sensor 80 to be too rich. When the mixture is richer than the desired ratio, the control strategy is to provide a lean proportional fixed incremental increase or "step" in fuel injection amount (i.e., decrease in fuel) in order to make the mixture lean.

Most commonly, the first adjustment in either the lean or rich direction is a large incremental step which varies in accordance with a map depending upon engine speed. Once the initial proportional adjustment is made, then the program waits a time interval, after which smaller incremental steps are then employed, these incremental step values also derived from a map. Once the mixture is sensed by the sensor 80 a crossing stoichiometric again, subsequent adjustments to the mixture are made by the ECU 70 in the opposite direction.

Figure 8B:
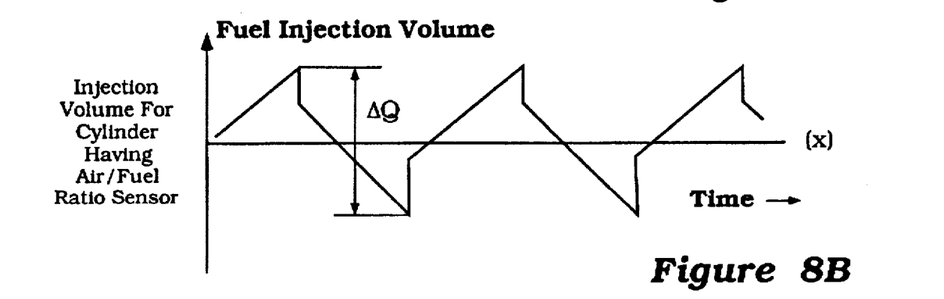
FIG. 8b is a diagram illustrating the fuel injection volume for a single cylinder having an air/fuel sensor, versus time.
Figure 8C:
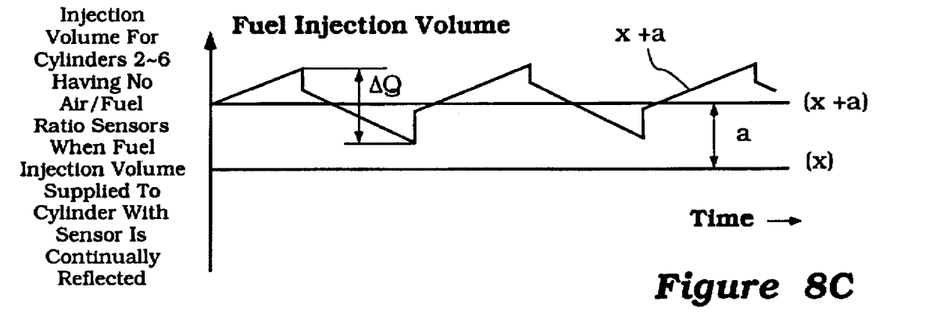
FIG. 8c is a diagram illustrating the fuel injection volume for the remaining cylinders, versus time.
Figure 8D:
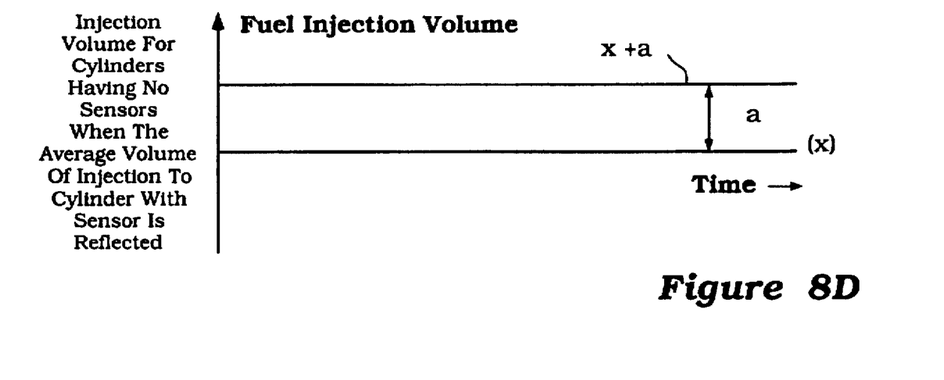
FIG. 8d is a diagram illustrating the average fuel injection volume for the remaining cylinders, versus time.

FIG. 8b illustrates the change in fuel injection volume to the cylinder which is monitored by the sensor 80. As illustrated, when the mixture lean, the fuel injection amount to the cylinder is increased. Once the mixture is sensed as rich, the ECU 70 makes a first large drop in fuel injection amount, followed by smaller incremental decreases (shown in approximate fashion by the diagonal line). The total change in injection volume to the cylinder between greatest and least injection volume is ΔQ, corresponding to a maximum differential sensor 80 output.

Figure 7:
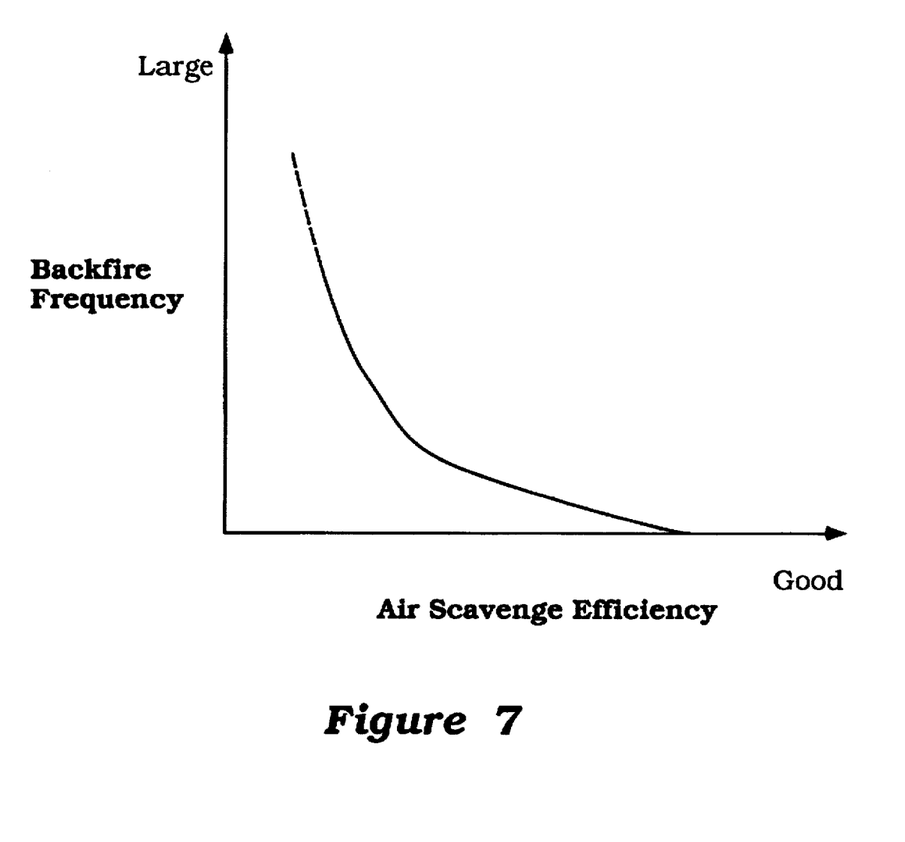
FIG. 7 is a diagram illustrating backfire frequency of the engine with respect to air scavenging efficiency.

When the engine 24 is idling, scavenging of exhaust gases is poor. Thus, a great deal of exhaust gas created in the combustion chambers is not exhausted and instead remains in the combustion chamber for the next combustion cycle. As illustrated in FIG. 7, when air scavenge efficiency is low, backfire frequency is high. This is due, in part, to the fact that the presence of a large quantity of exhaust gas in the combustion chamber prevents complete combustion of the fuel in the air/fuel charge applied to the cylinder in the next combustion cycle.

Figure 9:
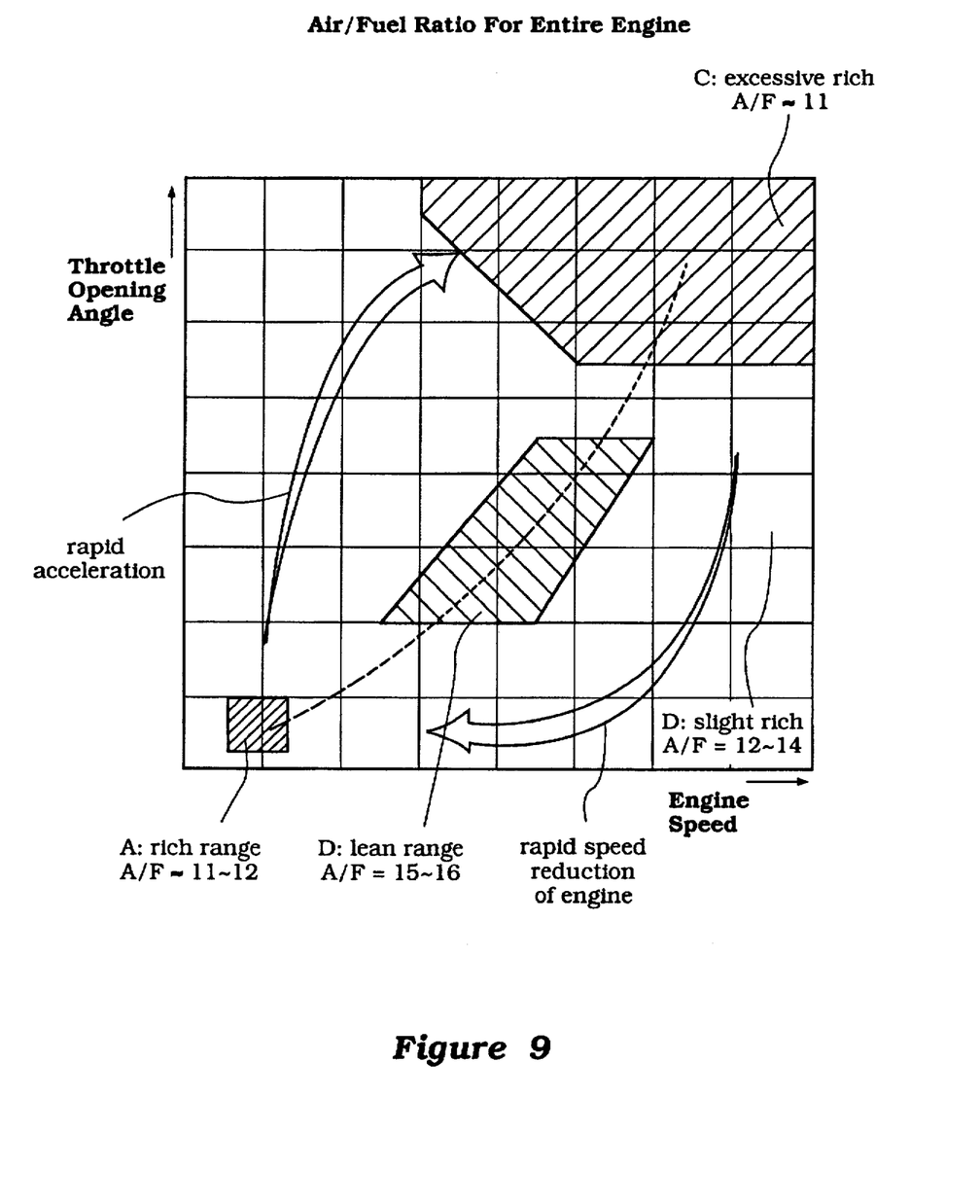
FIG. 9 is a diagram illustrating the air/fuel ratio for the entire engine during times in which the engine is idling, accelerating, decelerating, and maximum rpm conditions.

The backfire problem is accentuated at idling engine speed. As illustrated in FIG. 9, when the engine 24 is idling, the air/fuel mixture supplied to the engine is preferably rich (i.e., more fuel than stoichiometric is supplied, resulting in an air/fuel ratio less than stoichiometric, or about 11 or 12 to 1 as compared to about 14.7 to 1). Thus, at idle, the air/fuel mixture is rich at the same time that the scavenging efficiency is poor. In addition, as with the typical engine feedback control described above, the feedback control adjusts the air/fuel ratio such that at times the air/fuel mixture is richer than optimum, and sometimes leaner than optimum. When the feedback control makes adjustments causing the air/fuel ratio to be even richer (i.e., containing more fuel) than optimum, backfire is an even greater problem.

Thus, in accordance with the present invention, the engine control (here, the ECU 70) includes a backfire control mechanism which operates to control backfire during feedback control. The system of the present invention allows the feedback control to optimize the air/fuel mixture supplied the engine 24, and at the same time controls backfire.

Preferably, the backfire control mechanism controls backfire in the cylinder which is monitored by the sensor 80 differently from the non-monitored cylinders. The backfire control mechanism utilized by the ECU 70 to control backfire in the monitored cylinder is preferably chosen to prevent backfire, but have little effect on the feedback control.

As can be understood, one mechanism for limiting backfire in the monitored cylinder would be to have the feedback control simply alter the air/fuel ratio significantly. This, however, might have the result of changing the air/fuel from a desired ratio for all cylinders to an undesired ratio in view of other engine considerations.

The backfire control mechanism corresponding to the monitored cylinder preferably limits or controls backfire when necessary without so affecting the feedback control. A first backfire control mechanism is for the ECU 70 to provide, when the engine's sensors indicate a backfire condition (such as a pressure spike in the exhaust pressure received from an exhaust pressure sensor corresponding to a previous backfire, or a signal from the sensor 80), an additional amount of air to the monitored cylinder. This additional air facilitates combustion of a greater amount of the fuel supplied the cylinder, preventing backfire.

A second backfire control mechanism is for the ECU 70 to advance the ignition timing. Using this mechanism, when the engine's sensors indicate a backfire condition, the ECU 70 advances the timing of the spark plug 68 firing in the monitored cylinder. This advancement in the firing allows for a longer combustion time in the combustion chamber, burning more of the fuel within the chamber.

A third backfire control mechanism is for the ECU 70 to cause the feedback control to make smaller incremental adjustments in the air/fuel mixture. When a backfire condition is sensed by the sensors, the ECU 70 is programmed to cause the feedback control to make smaller incremental adjustments and have a smaller than normal total air/fuel mixture adjustment deviation. This prevents the feedback control from adjusting the air/fuel mixture too far to the rich side of the desired air/fuel ratio. At the same time, however, the feedback control maintains the same overall desired air/fuel mixture ratio.

Each of these three mechanisms may be utilized alone or in conjunction with one another. Each mechanism effectively prevents backfire, but does not require a change in the overall feedback control strategy.

Backfire control of the non-monitored cylinders may be accomplished by the ECU 70 utilizing changes in the parameters set forth above. Preferably, however, the backfire control of these cylinders is accomplished by the ECU 70 through a mechanism which does affect feedback control. The backfire control mechanism may, as with the monitored cylinder, comprise an increase in air volume supplied or advancement in ignition timing. In addition, and unlike the backfire control corresponding to the monitored cylinder, backfire control in these other cylinders may be accomplished by changing the overall air/fuel ratio supplied to the engine (by making the air/fuel mixture leaner, i.e., providing a higher air to fuel ratio) by having ECU 70 adjustment of the overall feedback control settings.

Figure 10:
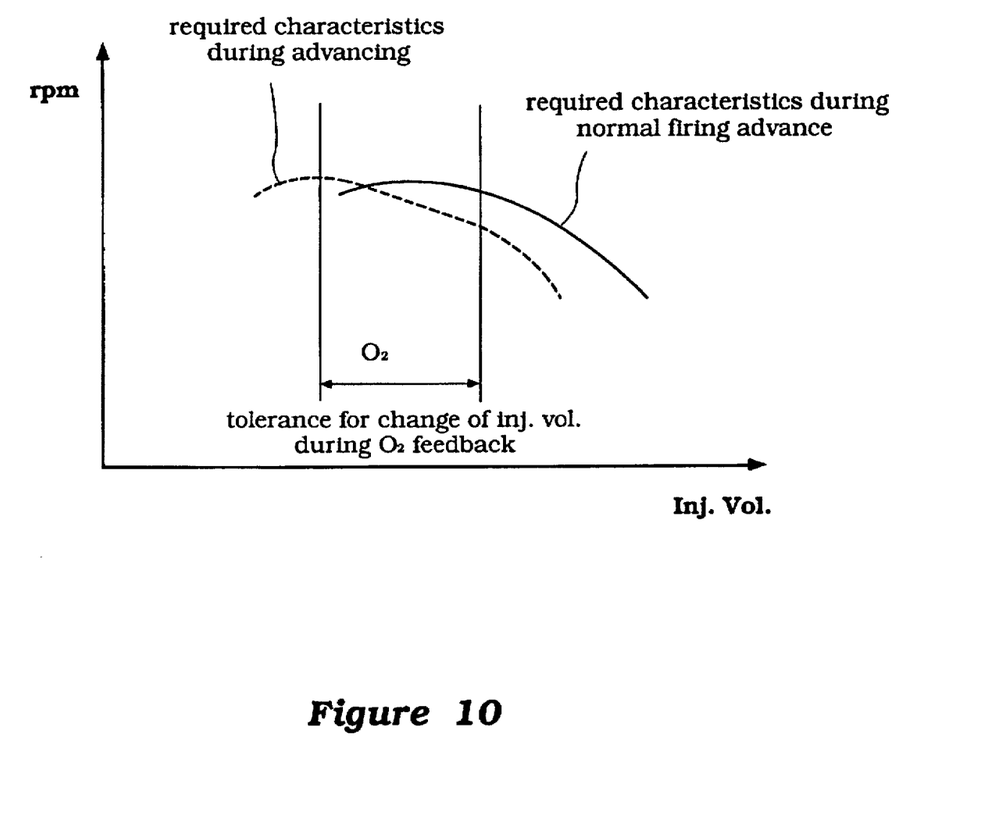
FIG. 10 is a diagram illustrating a normal ignition advancement curve for engine rpm versus fuel injection volume, and an ignition advancement curve for advancement in accordance with the present invention to prevent backfire.

FIG. 10 illustrates the effect of advancing the ignition firing in accordance with the system and method of preventing backfire of the present invention. As illustrated therein by the solid line, as engine speed increases, ignition firing is advanced during normal operation of the engine. In accordance with the present invention, the ECU 70 may further advance ignition firing (as indicated by the dotted line) to prevent backfire. As indicated by the dotted line, advancing the ignition firing has the effect of enabling the engine rpm to remain the same while supplying less fuel supplied to the engine.

Of course, the foregoing description is that of preferred embodiments of the invention, and various changes and modifications may be made without departing from the spirit and scope of the invention, as defined by the appended claims.

What is claimed is:

1. An internal combustion engine comprising a combustion chamber, an air/fuel charging system for delivering an air and fuel charge to said combustion chamber for combustion therein, a combustion condition sensor for determining the air/fuel ratio in said combustion chamber, a combustion control system including feedback control means for adjusting the air/fuel ratio delivered to said combustion chamber in response to the output of said combustion condition sensor and backfire control means for preventing backfire during operation of said feedback control means.

2. An internal combustion engine as set forth in claim 1, wherein the backfire control means comprises means for increasing the volume of air supplied to said combustion chamber.

3. An internal combustion engine as set forth in claim 1, wherein the backfire control means comprises means for advancing the ignition timing in said combustion chamber.

4. An internal combustion engine as set forth in claim 1, wherein the backfire control means comprises means for decreasing the size of adjustments made to said air/fuel ratio by said feedback control means.

5. An internal combustion engine as set forth in claim 1, wherein said sensed combustion chamber corresponds to a first cylinder, said engine including at least one other cylinder, and wherein said backfire control means controls backfire corresponding to said first cylinder independently of said feedback control.

6. An internal combustion engine as set forth in claim 5, wherein said backfire control means controls backfire corresponding to all cylinders except said first cylinder utilizing said feedback control.

7. An internal combustion engine as set forth in claim 5, wherein said backfire control means controls backfire corresponding to all cylinders except said first cylinder by having said feedback control provide a leaner air/fuel mixture to said cylinders.

8. An internal combustion engine as set forth in claim 5, wherein said backfire control means controls backfire corresponding to said first cylinder by increasing the volume of air supplied to said cylinder.

9. An internal combustion engine as set forth in claim 5, wherein said backfire control means controls backfire corresponding to said first cylinder by adjusting the timing of ignition firing of said cylinder.

10. An internal combustion engine as set forth in claim 5, wherein said backfire control means controls backfire corresponding to said first cylinder by controlling said feedback control means so that smaller adjustments to said air/fuel ratio are made.

11. A method of operating an internal combustion engine comprising a first combustion chamber corresponding to a first cylinder and a sensor for determining the air/fuel ratio in said first combustion chamber and at least one other cylinder having a combustion chamber and an air/fuel changing system for delivering an air and fuel charge thereto, said method comprising the steps of adjusting the air/fuel ratio with a feedback control receiving output from said sensor and controlling backfire corresponding to said cylinders during operation of said feedback control.

12. A method of operating an internal combustion engine as set forth in claim 11, wherein backfire corresponding to said first cylinder is controlled in a manner which does not affect the feedback control.

13. A method of operating an internal combustion engine as set forth in claim 12, wherein said controlling of said backfire comprises increasing the volume of air supplied to the first cylinder.

14. A method of operating an internal combustion engine as set forth in claim 12, wherein said controlling of said backfire comprises advancing the ignition firing in said first combustion chamber.

15. A method of operating an internal combustion engine as set forth in claim 12, wherein said controlling of said backfire comprises having the feedback control adjust the air/fuel ratio in smaller steps than at other times.

16. A method of operating an internal combustion engine a set forth in claim 12, wherein backfire corresponding to all cylinders except said first cylinder is controlled by changing operational parameters of said feedback control.

17. A method of operating an internal combustion engine as set forth in claim 16, wherein said parameters are changed so that said feedback control adjusts the air/fuel ratio in the lean direction.

* * * * *